United States Patent [19]

Lakes

[11] Patent Number: 4,668,557
[45] Date of Patent: May 26, 1987

[54] POLYHEDRON CELL STRUCTURE AND METHOD OF MAKING SAME

[75] Inventor: Roderic S. Lakes, Iowa City, Iowa

[73] Assignee: The University of Iowa Research Foundation, Iowa City, Iowa

[21] Appl. No.: 886,833

[22] Filed: Jul. 18, 1986

[51] Int. Cl.$^4$ .............................................. B32B 3/10
[52] U.S. Cl. ................................... 428/131; 264/321; 428/311.1; 428/312.8; 428/314.2; 521/918
[58] Field of Search ............ 264/321; 428/131, 304.4, 428/310.5, 311.1, 311.5, 312.2, 312.8, 314.2; 521/918

[56] References Cited

U.S. PATENT DOCUMENTS

| | | | |
|---|---|---|---|
| 3,194,854 | 7/1965 | Smith | 264/321 |
| 4,264,673 | 4/1981 | Breidenbach et al. | 428/314.2 |
| 4,299,883 | 11/1981 | Roth et al. | 428/314.2 |

Primary Examiner—William J. Van Balen
Attorney, Agent, or Firm—James C. Nemmers

[57] ABSTRACT

An open cell foam structure that has a negative Poisson's ratio. Structure can be created by triaxially compressing a conventional open-cell foam material and heating the compressed structure beyond the softening point to produce a permanent deformation in the structure of the material. The structure thus produced has cells whose ribs protrude into the cell resulting in unique properties for materials of this type.

7 Claims, 5 Drawing Figures

POLYHEDRON CELL STRUCTURE AND METHOD OF MAKING SAME

BACKGROUND OF THE INVENTION

Low density foamed polyhedron cell structures are well known. The conventional open-cell foam structure consists of a plurality of inter-connected, three dimensional cells which are generally convex. In a conventional open-cell structure, all or a portion of the cell faces may be absent, but the cells are intercommunicating and the cellular structure is retained. Depending upon the molecular structure of the material, a foamed cellular material may range from quite rigid to a material that is soft and flexible. The flexible foamed cellular structures are resilient and recover their original shape after deformation.

All known engineering materials including open-cell foam cellular structures have a positive Poisson's ratio and thus contract laterally when stretched and expand laterally when compressed. Also, bent beams of conventional materials which have a positive Poisson's ratio display the conventional cross-sectional configuration known as "anticlastic curvature".

There are known techniques for modifying the compress/deflection characteristics of certain types of open-cell foam materials. One of these techniques is described in U.S. Pat. No. 3,025,200 issued on Mar. 13, 1962 for an invention by William R. Powers entitled "Celliform Structure and Method of Making Same". This patents teaches that if a foam material is permanently compressed, its properties can be changed so that the material responds with linear strain when linear stress is applied. Conventional untreated materials produce non-linear response. However, the teaching of the foregoing patent is the application of compression in one direction only, and the resulting material has a positive Poisson's ratio.

If an open-cell foam material could be produced with the property of a negative Poisson's ratio, there would be numerous possible applications such as fasteners, gaskets and other seals, as well as applications for shock absorbing and cushioning materials. There is therefore a need for an improved material of the open-cell foam type having a negative Poisson's ratio. There is specially a need in many applications for such a material if such material could be produced by a simple and inexpensive method.

SUMMARY OF THE INVENTION

A conventional open-cell foam material of relatively low density is compressed in three orthogonal directions, and while so compressed, the material is heated to a temperature which slightly exceeds the softening temperature of the material. The material is then cooled to room temperature, so as to permanently set the structure of the cells. The resulting material has a cell structure in which the ribs of the cells protrude into the cell. This permanent deformation of the cells results in a materia.1 that has a negative Poisson's ratio.

DESCRIPTION OF THE PREFERRED EMBODIMENT OF THE INVENTION

Figure 1:
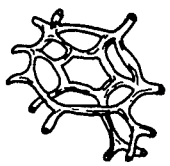
FIG. 1 is an illustration of the cell structure in a conventional open-cell foam material.

The invention relates to modification of an open-cell foam structure so as to produce a material with a negative Poisson's ratio. Poisson's ratio is defined in terms of the strains which occur when material is stretched and is equal to minus the transverse strain divided by the axial strain in the direction of stretch. With one possible exception, all known materials contract laterally when stretched and expand laterally when compressed, and therefore Poisson's ratio for such material is positive. For example, positive Poisson's ratios for various materials are 0.3 for steel, 0.5 for rubber, 0.1 to 0.4 for typical polymer foams and almost 0 for cork. Because cork has a positive Poisson's ratio just slightly above 0, an ideal practical application for cork is in sealing a wine bottle. In this application, the cork can be easily inserted and removed, yet it withstands the pressure from within the bottle. Rubber, with a Poisson's ratio of positive 0.5, could not be used for this purpose because it would expand when compressed for insertion into the neck of the bottle and therefore would jam.

Although negative Poisson's ratios are theoretically possible, they have generally not been observed in any known materials. In a Treatise entitled *"Foundations of Solid Mechanics"* (Prentice Hall 1968) Y. C. Fung indicates that in an isotropic material the allowable range of Poisson's ratio is from negative 1.0 to positive 0.5 based on energetic considerations in the theory of elasticity. However, Fung states that materials with negative values of Poisson's ratio are unknown. On the other hand, A. E. H. Love in *"A Treatise on the Mathematical Theory of Elasticity"* (Dover 4th Ed. 1944) presents a single example of single crystal pyrite as having a negative Poisson's ratio of 0.14. However, such a crystal is cubic rather than isotropic.

The structure of a conventional open-cell foam material is shown in FIG. 1 in which each cell is defined by a plurality of ribs that define a polyhedron structure with the cells being interconnected, thus forming a three dimensional network of ribs or strands. The spaces between the ribs are open, and thus the individual cells are open. This is in contrast to a cell structure in which the ribs would define walls of a cell, which walls would enclose the cell to form a closed-cell structure.

Preferably, the starting material is an open-cell foam structure as indicated which has a low density. Such a material would have, relatively speaking, a larger space between the ribs of each cell than would a high density material. Also, regardless of the number of ribs forming the polyhedron cell structure, the cells should be convex in configuration, and the material should have sufficient resilience to recover its original shape after deformation. I have found, for example, that a polyester foam material marketed by Scott Paper Company as "Scott Industrial Foam" is a suitable low-density material that has a convex polyhedron open-cell structure of the general type illustrated in FIG. 1.

Figure 2:
FIG. 2 is an illustration of the cell structure after transformation according to the principles of the invention.
Figure 3:
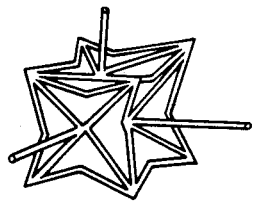
FIG. 3 is a schematic view of an ideal cell structure after transformation according to the principles of the invention.

Force is then applied to the selected material in each of three orthogonal directions or triaxially to compress the material. This triaxial compression causes the ribs of the cells to buckle inwardly into a "re-entrant" structure. The compressed material is then placed in a mold or is otherwise held in the compressed state and heat is applied to the material by heating the mold or in any other suitable manner until the temperature of the material slightly exceeds the softening temperature of the foam material. I have found that a temperature in the range of 163° to 171° centigrade was effective. The mold containing the compressed material is then allowed to cool to room temperature, and the material removed from the mold. The triaxial compression and heating to the correct temperature produces permanent transformation of the cell structure in which the ribs protrude into the cell as illustrated in FIG. 2. This transformed structure of an open-cell foam I have termed a "re-entrant" structure, and in FIG. 3 there is illustrated an ideal re-entrant foam structure for a single cell that has been triaxially compressed. Note in FIG. 3 that the ribs or struts in each face of the cell protrude into the cell. Although it is not strictly necessary for the permanent deformation from the triaxial compression to be the same in each of the three directions, the overall deformation should be of the correct order of magnitude since too little permanent deformation results in failure to create re-entrant structure. On the other hand, if the deformation is excessive, portions of the structure may become intertwined and not produce the desired result of a negative Poisson's ratio.

Also, the temperature selected to bring about the permanent deformation will depend, of course, upon the material being treated. The temperature must be slightly above the temperature at which the material becomes soft, but if too low a temperature is used, the material will not be permanently deformed. On the other hand, if too high a temperature is used, the material may actually turn into a liquid or semi-liquid state and flow together and not produce the desired result.

In an actual test using a polyester foam marketed by Scott Paper Company and identified as "Scott Industrial Foam", the material was compressed triaxially to 60-80% of its original dimension in each of the three directions. As previously described, the material was then placed in a mold and heated to a temperature in the range of 163° to 171° centigrade, held at that temperature for minutes and then allowed to cool to room temperature. After the cooled material was removed from the mold, the mechanical properties of the transformed material were measured. The Scott Industrial Foam prior to transformation had a density of 0.03 gm/cm$^3$. After being transformed, the density was measured to be 0.12 gm/cm$^3$. Before the transformation, the foam material had a Young's modulus in tension of 71kPa (10 PSI) whereas after transformation, Young's modulus was measured to be 72 kPa (10 PSI). The significant change however was in Poisson's ratio. Prior to the transformation, the foam material had a positive Poisson's ratio of 0.4, whereas after transformation, the material had a negative Poisson's ratio of 0.7. The cutability of the material also changed in that the material was easily cut with a sharp blade prior to transformation, whereas after transformation it was much more difficult to cut the material.

Figure 4A:
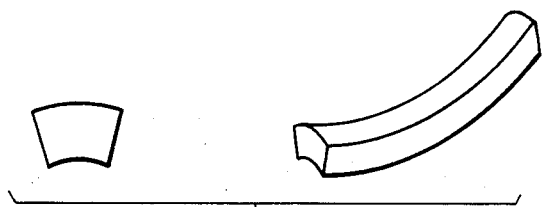
FIGS. 4a and 4b compare the curvature of a bent beam before and after transformation.
Figure 4B:
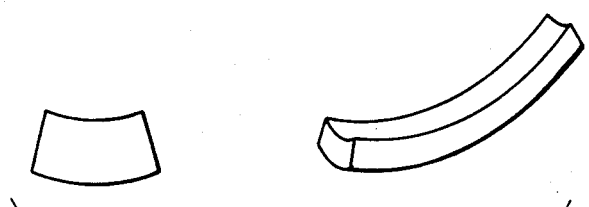

As a further illustration of the effects of the change from a positive to a negative Poisson's ratio, a piece of foam material both before and after transformation was cut into the shape of an elongated rectangular beam. The material was then bent transversely to its longitudinal axis in the direction of the short side of the rectangular cross-section. When the material before and after transformation was compared in a bent condition, the cross-section of the material after transformation displayed a curvature opposite to the principal curvature in the direction of bending. This is known as "anticlastic curvature" and is predictable by the theory of elasticity when Poisson's ratio is positive, which is the case for ordinary materials. In FIG. 4a there is illustrated the anticlastic curvature of ordinary material having a positive Poisson's ratio. By contrast, FIG. 4b shows the material with a negative Poisson's ratio, and it is clear that the curvature is in the direction opposite to material with a positive Poisson's ratio. This can be referred to as "synclastic curvature", and this phenomenon has not to my knowledge been reported anywhere, although according to the theory of elasticity, synclastic curvature would be consistent with a negative Poisson's ratio.

Although I have described only a preferred embodiment of the invention, the method and the resulting properties of open-foam material is not restricted to polymeric foams. For example, an open-cell metallic foam might be used as a starting material for the transformation process. The temperature required for the transformation of a metallic foam could be expected to be a significant fraction of the melting temperature for the metal. Also, metal foams are obviously much more rigid than polymeric foams of comparable structure, since homogenous metals have a much higher modulus of elasticity than polymers.

A re-entrant structure for an open-cell metallic foam may also be produced by irreversibly (plastically) deforming the foam at room temperature, deformation being accomplished by sequentially and incrementally applying force in each of three perpendicular directions.

Also, creating an open-cell foam material with a negative Poisson's ratio has been described as using an existing open-cell material and transforming it by the described method steps. However, a material having the same property of a negative Poisson's ratio could be produced during the initial forming process by restraining the material as it is formed thereby causing the ribs or struts forming the cells to buckle inwardly and then allowing the material to cool and harden under restraint.

There are numerous potential applications for a material of the type described herein having a negative Poisson's ratio. For example, since a material with a negative Poisson's ratio expands laterally when stretched, a cylindrical plug of foam material could be used as a fastener by press-fitting it into a cylindrical cavity. Attempts to remove the plug would result in its lateral expansion against the walls of the cylindrical cavity. This would have numerous fastening applications in the manufacture of products where it was either impossible or expedient not to use two-piece fasteners to join two components together.

Conventional polymeric foams are also often used as a cushioning or shock absorbing material. The compliance of such a foam material is controlled by its density, and in conventional foam structures the modulus of elasticity (the inverse of the compliance) is proportional to the square of the density. Therefore, low density is associated with a compliant foam, but low density foams are also weak and easily abraded. The transformed foam material of the invention is compliant but it is also relatively dense, and therefore would be more advantageous than conventional foam materials in applications where superior strength and abrasion resistance are desired along with a compliant foam.

Polymeric foams are also currently used in a wide variety of applications for air filters, shoe soles, sandwich panels, humidifier belts, sound absorbers, sponges, gaskets and in medical supplies. In any of these situations in which a combination of compliance and strength is required, the transformed foam having a negative Poisson's ratio would be far superior. Further examples in the medical field would be as a cushioning material for individuals who are immobilized for long periods of time. Such persons frequently develop pressure sores or "bed sores" due to the effects of prolonged pressure on the blood vessels of the skin and underlying tissues. The transformed foam material of the invention would be useful in preventing these pressure sores.

A thin layer of transformed foam of the invention could be used as a replacement for the conventional ankle or elbow wrap since the foam would be less likely to become loose during physical activity because of the negative Poisson's ratio.

In another medical application, artificial blood vessels are typically made of a Dacron fabric which has a positive Poisson's ratio. The interstices in the fabric allow the body to generate a new lining for the vessel. A porous material having a negative Poisson's ratio would be advantageous in this application in that the stresses at the interface with the natural vessel may be reduced, thus improving the reliability of the graft. In addition, a superior match between resilience of the graft and that of the natural vessel may be achievable with material having a negative Poisson's ratio, resulting in a graft that would be likely to cause clotting of blood near the interface.

In current applications where conventional foams are used as filters, the filters obviously can become clogged with filtrate, increasing the pressure in the system. When this occurs, the pressure difference across the filter can collapse the pores, further hampering and retarding flow through the filter. A filter made of material that has a negative Poisson's ratio would be advantageous since a bulging of the filter element would tend to open rather than close the pores. This would help to maintain flow in the system without affecting the ability of the material to perform its function of retaining the filtrate.

Although the invention has been described only in connection with the preferred embodiment of it, it will be evident to those skilled in the art that various revisions and modifications can be made to the described method and material without departing from the spirit and scope of the invention. It is further evident that the principles of the invention are applicable to a variety of materials used in a variety of applications. It is my intention however that all such revisions and modifications, and the various materials and their uses and applications will be included within the scope of the following claims.

What is claimed is:

1. The method of making a composition of matter having a negative Poisson's ratio comprising the steps of producing a starting material having an open-cell foam structure with each cell being defined by a plurality of ribs; applying sufficient force to the starting material in each of three orthogonal directions simultaneously to compress the ribs of the cells inwardly; raising the temperature of the material above the softening temperature of the material while maintaining the material in the compressed state; cooling the material below the softening temperature while continuing to maintain the material in the compressed state: and releasing the applied force once the material has cooled below the softening temperature.

2. The method of claim 1 in which the starting material is an open-cell foam structure which has a low density.

3. The method of claim 2 in which the starting material is an open-cell isotropic structure.

4. A material having a negative Poisson's ratio produced by the method of claim 1.

5. A method of making an open-cell isotropic material having a negative Poisson's ratio comprising the steps of restraining the material from three orthogonal directions during the formation of the material and allowing the material to cool while maintaining the restraint.

6. A material having a negative Poisson's ratio produced by the method of claim 5.

7. An isotropic open-cell material having a negative Poisson's ratio, said material comprising a plurality of interconnected spaced-apart ribs defining a plurality of cells, the ribs in the cells protruding inwardly.

* * * * *